United States Patent
Girbach (12)

(10) Patent No.: US 8,281,571 B2
(45) Date of Patent: Oct. 9, 2012

(54) METHOD FOR THREE ZONE DIESEL OXIDATION CATALYST LIGHT OFF CONTROL SYSTEM

(75) Inventor: Jeffrey M. Girbach, Farmington, MI (US)

(73) Assignee: Detroit Diesel Corporation, Detroit, MI (US)

( * ) Notice: Subject to any disclaimer, the term of this patent is extended or adjusted under 35 U.S.C. 154(b) by 846 days.

(21) Appl. No.: 12/399,507

(22) Filed: Mar. 6, 2009

(65) Prior Publication Data

US 2010/0223913 A1    Sep. 9, 2010

(51) Int. Cl.
*F01N 3/00* (2006.01)

(52) U.S. Cl. ............... 60/286; 60/274; 60/285; 60/295; 60/297; 60/301; 60/303

(58) Field of Classification Search .............. 60/274, 60/285, 286, 295, 297, 303, 311
See application file for complete search history.

(56) References Cited

U.S. PATENT DOCUMENTS

| | | | | |
|---|---|---|---|---|
| 5,842,341 A * | 12/1998 | Kibe | ............................... | 60/274 |
| 6,622,480 B2 * | 9/2003 | Tashiro et al. | ................... | 60/295 |
| 6,907,725 B2 * | 6/2005 | Szymkowicz et al. | .......... | 60/285 |
| 7,076,944 B2 | 7/2006 | Okugawa et al. | | |
| 7,115,237 B2 | 10/2006 | Sato et al. | | |
| 7,117,667 B2 | 10/2006 | Mital et al. | | |
| 7,143,578 B2 | 12/2006 | Kakwani et al. | | |
| 7,210,286 B2 | 5/2007 | Sun et al. | | |
| 7,231,761 B2 | 6/2007 | Okugawa et al. | | |
| 7,281,518 B1 | 10/2007 | Allain et al. | | |
| 7,351,382 B2 | 4/2008 | Pfeifer et al. | | |
| 2008/0010971 A1 | 1/2008 | Gioannini et al. | | |
| 2008/0163610 A1 | 7/2008 | Baird et al. | | |
| 2008/0196389 A1 | 8/2008 | Stroia et al. | | |

* cited by examiner

*Primary Examiner* — Thomas Denion
*Assistant Examiner* — Diem Tran
(74) *Attorney, Agent, or Firm* — Bill C. Panagos; Butzel Long, PC

(57) ABSTRACT

A method to regenerate a diesel particulate filter in an exhaust system with a fuel doser for normal and transient vehicle travel. The vehicle may be equipped with an electronically controlled compression ignition engine with an electronic control unit having memory and capable of receiving data signals from remote senor indicative of vehicle operating conditions.

14 Claims, 2 Drawing Sheets

METHOD FOR THREE ZONE DIESEL OXIDATION CATALYST LIGHT OFF CONTROL SYSTEM

TECHNICAL FIELD

Compression ignition engines, and vehicle powered by such engines, have, in the past, been the subject of much research into reducing or eliminating particulate emissions and $NO_x$ emissions. Exhaust system component and systems have been developed that include diesel particulate filters, diesel oxidation catalysts and other components to reduce the amount of particulate or $NO_x$ emissions out of the tailpipe. In some systems, a fuel doser is placed in close proximity to a component, such at a diesel particulate filter or a diesel oxidation component, to supply a predetermined quantity of hydrocarbon at the appropriate times to burn off particulate matter and help regenerate the components.

Exhaust system component regeneration is a necessity for efficient emissions control and vehicle operation. During operation, it is oftentimes the case that a vehicle is operated in transient conditions, that is, in city stop and go driving where the exhaust gas temperature does not reach optimum highs to facilitate a regeneration event at the exhaust system during fuel dosing.

There is a need to develop a method to regenerate exhaust system components for diesel engines that takes into account the mode of vehicle travel.

SUMMARY

In one embodiment the application relates to method to regenerate a diesel particulate filter in an exhaust system with a fuel doser for normal and transient vehicle travel. The vehicle is equipped with an electronically controlled compression ignition engine with an electronic control unit having memory and capable of receiving data signals from remote senor indicative of vehicle operating conditions. In one embodiment, the method includes:
  A method to regenerate a diesel oxidation catalyst in an exhaust system with a fuel doser for normal and transient vehicle travel; said vehicle equipped with an electronically controlled compression ignition engine with an electronic control unit having memory and capable of receiving data signals from remote senor indicative of vehicle operating conditions;
  determining exhaust gas flow temperature at the diesel oxidation catalyst inlet;
  determining whether the exhaust gas temperature at the diesel oxidation catalyst inlet exceeds a first predetermined temperature value for a first predetermined period of time;
  dosing the exhaust system at the diesel oxidation catalyst inlet with a quantity of fuel based upon the exhaust gas flow temperature for a given predetermined period of time to regenerate a diesel particulate filter;
  determining whether the exhaust gas temperature at the diesel oxidation catalyst inlet exceeds a second, lower predetermined temperature for a second predetermined period of time;
  determining whether the exhaust temperature at the DOC inlet exceeds a second predetermined temperature for less than a second predetermined period of time;
  dosing the exhaust system at the diesel oxidation catalyst inlet with a quantity of fuel for up to a second predetermined period of time.

In another embodiment, the application relates to a method to determine operation mode of a vehicle having a compression ignition engine with an exhaust system including a fuel doser and a diesel oxidation catalyst. The engine is equipped with an electronic control unit with memory and is capable of receiving data input signals from remote sensors indicative of operating conditions. The method includes:
  determining exhaust gas temperature at the diesel oxidation catalyst inlet;
  determining whether the exhaust gas temperature at the diesel oxidation catalyst inlet exceeds a first predetermined temperature for a first predetermined period of time;
  determining whether the exhaust gas temperature at the diesel oxidation catalyst inlet exceed a second predetermined temperature for a second predetermined period of time;
  determining the vehicle operation mode based upon the temperature at the diesel oxidation catalyst for a predetermined period of time;
  dosing the exhaust gas stream at the diesel oxidation catalyst with a quantity of fuel for a predetermined duration of time based upon the mode of vehicle travel to regenerate the diesel particulate filter.

DETAILED DESCRIPTION

Figure 1:
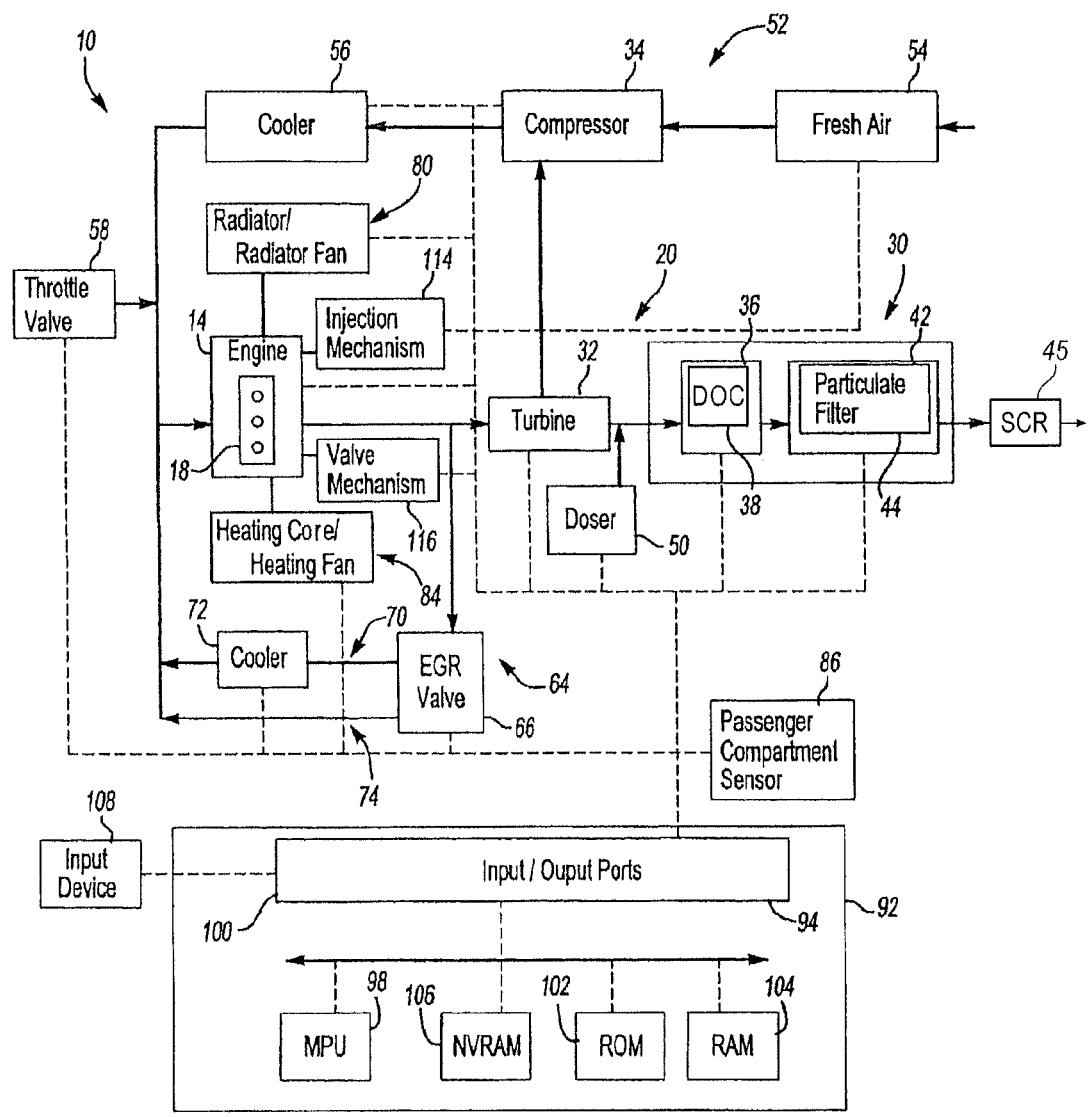
FIG. 1 is a schematic representation of a system in accordance with one non-limiting aspect of the present application.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include a diesel oxidation catalyst (DOC) canister 36, which in includes a DOC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the DOC canister 36 or substrate 38 and that the particulate filter 44 may be located in other portions of the exhaust system 20, such as upstream of the turbine 32.

The DOC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The DOC and particulate filter canisters 36, 42 may include inlets and outlets having defined cross-sectional areas with expansive portions there between to store the DOC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the DOC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. The throttle valve 58 may be an electrically operated valve. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming fuel charge and lower peak combustion temperatures to reduce the amount of oxides of nitrogen produced during combustion. The amount of exhaust gas to be re-circulated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an air cooler 72, and an EGR non-cooler bypass 74. The EGR value 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 invention may operate in conjunction with a heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information there between. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to any of the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

Figure 2:
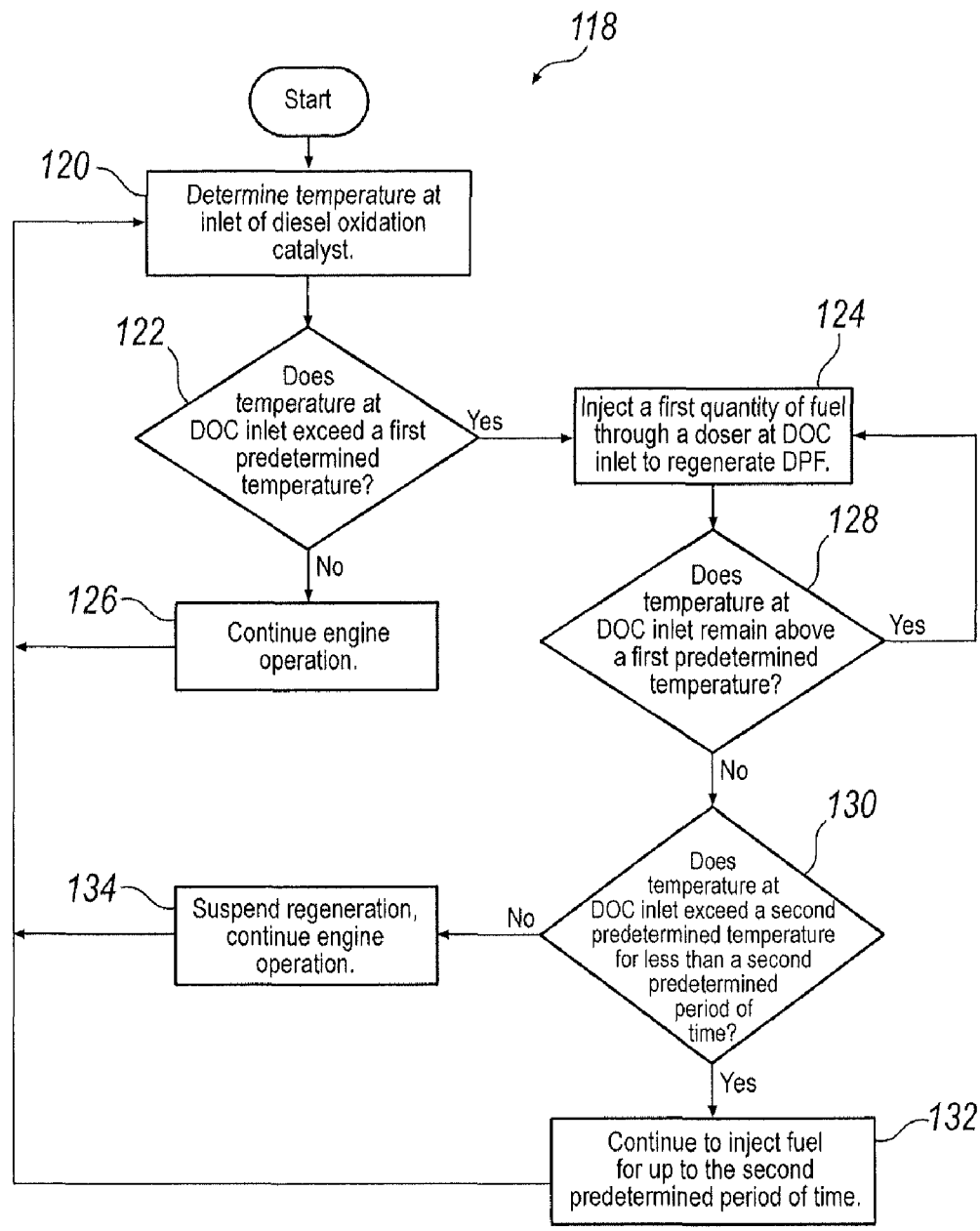
FIG. 2 is a schematic representation of a software flow chart in accordance with one non-limiting aspect of the present application.

Turning to FIG. 2, method 118 is one non-limiting embodiment of the present application. Step 120 is determining the temperature of the exhaust gas flow at the DOC inlet. This is accomplished by a temperature sensor electronically connected to the electronic control unit to provide data signals indicative of operating conditions at the DOC inlet. Step 122 is determining whether the exhaust gas flow temperature at the DOC inlet exceeds a first predetermined temperature in memory of the controller for a first predetermined period of time in the memory of the controller. If yes, then the controller activates the fuel doser, and at step 124, a first predetermined quantity of fuel is provided through a fuel doser to the inlet of the DOC to facilitate regeneration of the Diesel Duplicate Filter (DDF). From step 124, the method proceeds to step 128, where a determination is made whether the temperature at the DOC inlet remains above a first predetermined temperature. If the determination in step 124 is yes, the software method loops back to step 124. If the determination in step 128 is no, step 130 determines whether the temperature at the DOC inlet exceeds a second pre-determined temperature for less than a second predetermined period of time. If the determination at step 130 is yes, step 132 is continued to inject fuel for up to the second pre-determined period of time, and then the software loops back to step 120. If the determination at step 130 is no, step 134 is suspending regeneration and continue normal engine operation. The software then loops back to step 120. The entire method is envisioned as a closed loop system that continually monitors temperature at the DOC inlet to determine whether and in what manner to inject fuel into the DOC inlet to facilitate DOC regeneration.

It can also be understood that the temperature and period of time at the DOC can also indicate whether the engine is operating in on-highway operation mode, or whether the vehicle is operating in transient, or stop and go city driving. If it is determined that the first predetermined temperature is not reached for a first predetermined period of time, but rather the vehicle operates such that only the second predetermined temperature is reached for the second predetermined period of time, it can be understood that the vehicle is operating in a transient i.e., city driving stop and go mode.

While embodiments of the application have been illustrated and described, it is not intended that these embodiments illustrate and describe all possible forms of the invention. The words used in this application are words of description and not words of limitation. Many variations and modifications can be made without departing from the scope and spirit of the invention as set forth in the appended claims.

I claim:

1. A method to regenerate a diesel oxidation catalyst in an exhaust system with a fuel doser for normal and transient vehicle travel; said vehicle equipped with an electronically controlled compression ignition engine with an electronic control unit having memory and for receiving data signals from remote senor indicative of vehicle operating conditions;

determining exhaust gas flow temperature at the diesel oxidation catalyst inlet;

determining whether the exhaust gas temperature at the diesel oxidation catalyst inlet exceeds a first predetermined temperature value for a first predetermined period of time;

dosing the exhaust system at the diesel oxidation catalyst inlet with a quantity of fuel based upon the exhaust gas flow temperature to regenerate a diesel particulate filter;

determining whether the exhaust gas temperature at the diesel oxidation catalyst inlet exceeds a second, predetermined temperature for a second predetermined period of time, the second predetermined temperature being lower than the first predetermined temperature;

determining whether the exhaust temperature at the DOC inlet exceeds a second predetermined temperature for less than a second predetermined period of time, wherein if the temperature at the DOC inlet exceeds the second predetermined temperature for less than the second predetermined period of time, the method suspends regeneration and continues normal engine operation;

dosing the exhaust system at the diesel oxidation catalyst inlet with a quantity of fuel for up to a second predetermined period of time.

2. The method of claim 1, wherein if the exhaust gas temperature at the DOC inlet remains above a first predetermined temperature, a first quantity of fuel is injected through a doser at the DOC inlet to regenerate the diesel particulate filter.

3. The method of claim 1, wherein the diesel oxidation catalyst inlet first predetermined exhaust gas temperature is greater than the second predetermined exhaust gas temperature.

4. The method of claim 1, wherein the fuel dose for the diesel oxidation catalyst when the first predetermined temperature and first predetermined period of time are met is greater than the fuel dose when the second predetermined temperature and second predetermined period of time are met.

5. The method of claim 1, wherein the first predetermined period of time is less that the second predetermined period of time.

6. The method of claim 1, wherein determining the period of time the exhaust gas flow temperature exceeds a predetermined temperature for a predetermined period of time is indicative of vehicle travel mode.

7. The method of claim 1, wherein the vehicle is operating in transient travel mode when the exhaust gas temperature at the diesel oxidation catalyst inlet reaches the second predetermined temperature for the second predetermined period of time, but does not reach the first predetermined temperature for a first predetermined period of time.

8. The method of claim 1, wherein the vehicle is traveling in normal mode when the exhaust gas temperature at the diesel exhaust inlet meets the first predetermined temperature for the first predetermined period of time.

9. A method to determine operation mode of a vehicle having a compression ignition engine with an exhaust system including a fuel doser and a diesel oxidation catalyst, said engine equipped with an electronic control unit with memory, said electronic control unit for receiving data input signals from remote sensors indicative of operating conditions, said method comprising:

determining exhaust gas temperature at the diesel oxidation catalyst inlet;

determining whether the exhaust gas temperature at the diesel oxidation catalyst inlet exceeds a first predetermined temperature for a first predetermined period of time;

determining whether the exhaust gas temperature at the diesel oxidation catalyst inlet exceed a second predetermined temperature for a second predetermined period of time, wherein the diesel oxidation catalyst inlet first predetermined exhaust gas temperature is greater than the second predetermined exhaust gas temperature;

determining the vehicle operation mode based upon the temperature at the diesel oxidation catalyst for a predetermined period of time;

dosing the exhaust gas stream at the diesel oxidation catalyst with a quantity of fuel based upon the mode of vehicle travel to regenerate the diesel particulate filter.

10. The method of claim 9, wherein the fuel dose for the diesel oxidation catalyst when the first predetermined temperature and first predetermined period of time are met is greater than the fuel dose when the second predetermined temperature and second predetermined period of time are met.

11. The method of claim 9, wherein the first predetermined period of time is less that the second predetermined period of time.

12. The method of claim 9, wherein determining the period of time the exhaust gas flow temperature exceeds a predetermined temperature for a predetermined period of time is indicative of vehicle travel mode.

13. The method of claim 9, wherein the vehicle is operating in transient travel mode when the exhaust gas temperature at the diesel oxidation catalyst inlet reaches the second predetermined temperature for the second predetermined period of time, but does not reach the first predetermined temperature for a first predetermined period of time.

14. The method of claim 9, wherein the vehicle is traveling in normal mode when the exhaust gas temperature at the diesel exhaust inlet meets the first predetermined temperature for the first predetermined period of time.

* * * * *